USOO5787713A

United States Patent [19]
Russo

[11] Patent Number: 5,787,713
[45] Date of Patent: Aug. 4, 1998

[54] METHODS AND APPARATUS FOR LIQUID CRYOGEN GASIFICATION UTILIZING CRYOELECTRONICS

[75] Inventor: Carl J. Russo, Westlake, Ohio

[73] Assignee: American Superconductor Corporation, Westborough, Mass.

[21] Appl. No.: 671,860

[22] Filed: Jun. 28, 1996

[51] Int. Cl.$^6$ .................................................. F17C 7/04
[52] U.S. Cl. ............................ 62/48.1; 62/51.1; 62/259.2
[58] Field of Search .................................. 62/48.1, 51.1, 62/259.2

[56] References Cited

U.S. PATENT DOCUMENTS

| | | |
|---|---|---|
| 3,006,157 | 10/1961 | Haettinger et al. . |
| 3,021,683 | 2/1962 | McInroy . |
| 3,048,021 | 8/1962 | Coles et al. . |
| 3,320,755 | 5/1967 | Jepsen et al. . |
| 3,714,796 | 2/1973 | Longsworth . |
| 4,237,699 | 12/1980 | Longsworth et al. . |
| 4,541,249 | 9/1985 | Graves et al. . |
| 4,653,284 | 3/1987 | Steyert . |
| 4,781,033 | 11/1988 | Steyert et al. . |
| 4,947,007 | 8/1990 | Dew et al. . |
| 4,970,868 | 11/1990 | Grebe et al. ................. 62/259.2 |
| 5,117,639 | 6/1992 | Take ............................... 62/48.1 |
| 5,193,909 | 3/1993 | Duncan . |
| 5,265,431 | 11/1993 | Gaudet et al. . |
| 5,347,168 | 9/1994 | Russo . |
| 5,467,603 | 11/1995 | Lehman et al. ............... 62/48.1 |
| 5,548,962 | 8/1996 | Lugar et al. ................... 62/908 |

FOREIGN PATENT DOCUMENTS

403927  4/1974  U.S.S.R. .

OTHER PUBLICATIONS

York, "Heating Cryogenic Helium with a Solid Propellant Gas Generator", pp. 759–766, Proc. of the 1983 Cryogenic Eng. Conf., Colorado Springs, CO., (Aug. 15–17, 1983). Advances in Cryogenic Engineering, vol. 29, Fast, Ed., (1984).
Barron, "Cryogenic Systems", Oxford Univ. Press, New York, Clarendon Press, Oxford, pp. 150–237, 356–429 (1985).
Bell, Jr., "Cryogenic Engineering", Prentice–Hall, Inc., Englewood Cliffs, N.J., pp. 276–311 (1963).
Timmerhaus et al., "Cryogenic Process Engineering", Plenum Press, NY & London, pp. 1–9, 407–421 (1989).

Primary Examiner—Ronald C. Capossela
Attorney, Agent, or Firm—Choate, Hall & Stewart

[57] ABSTRACT

Methods and apparatus for gasification of liquid nitrogen and other cryogenic liquids are provided. The apparatus includes a gasification unit capable of refrigerating at least one cryoelectronics energy converter and utilizing the heat generated thereby to gasify a cryogenic fluid. Refrigeration is provided by the cryogenic fluid in the gasification unit. The gasification unit is preferably capable of gasifying at least 1 liter/hour of cryogenic fluid. The gasification unit can be coupled to a chemical processing unit such that gasified cryogenic fluid produced in the gasification unit can be introduced into the chemical processing unit for use therein. A secondary heat recovery unit can be provided upstream of the chemical processing unit to separate entrained liquid particles from the gasified cryogenic fluid produced by the gasification unit. Cryogenic fluid can be supplied to the gasification unit from an air liquefaction plant, a storage tank, a truck or the like. The gasification unit can be used to gasify nitrogen, liquefied natural gas, carbon dioxide, oxygen, hydrogen, argon, neon or other cryogenic fluids.

59 Claims, 6 Drawing Sheets

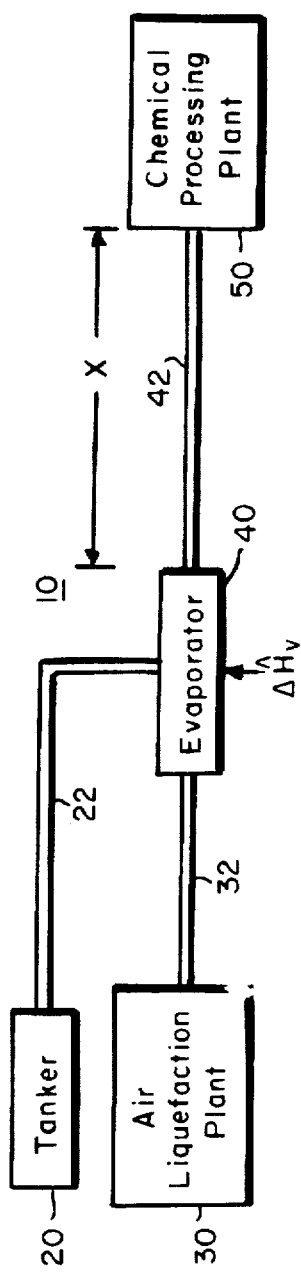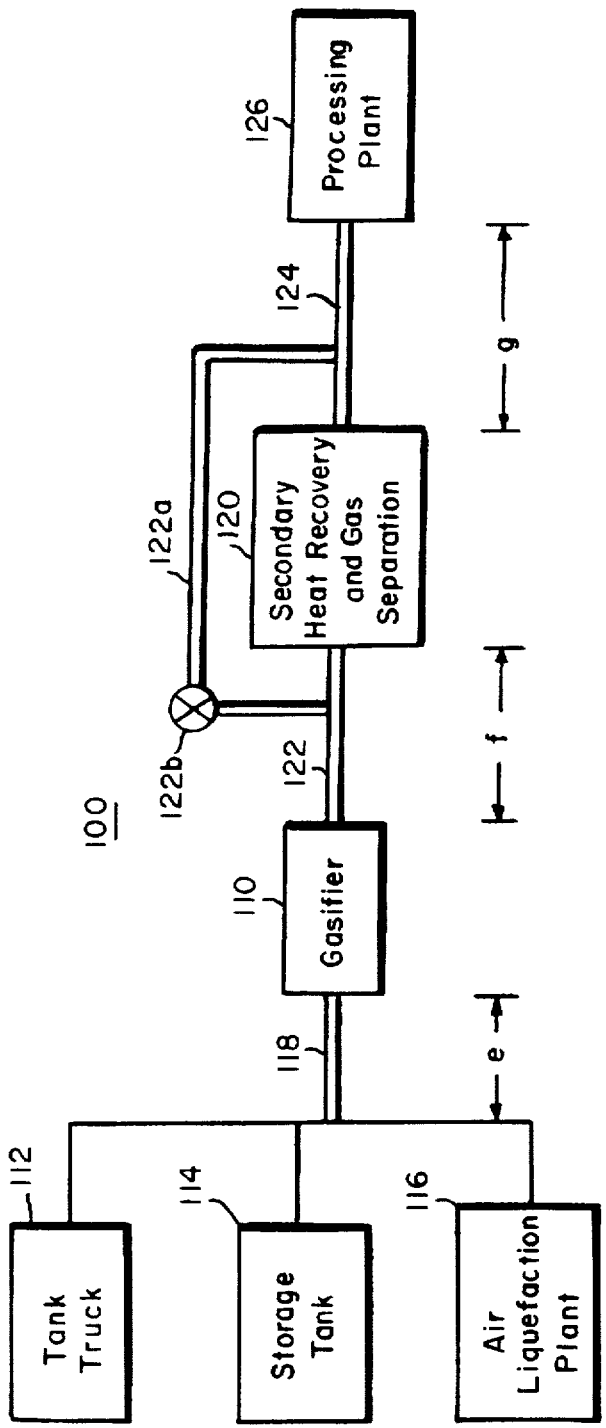

METHODS AND APPARATUS FOR LIQUID CRYOGEN GASIFICATION UTILIZING CRYOELECTRONICS

TECHNICAL FIELD

The present invention generally relates to methods and apparatus for liquid cryogen gasification and more particularly relates to liquid cryogen gasification utilizing cryoelectronic devices.

BACKGROUND OF THE INVENTION

Cryogenics relates to the production and maintenance of very low temperatures, often using cryogenic fluids such as hydrogen, helium, nitrogen, oxygen, air or methane. Various discussions concerning cryogenic systems can be found in literature. See e.g., Barron, *Cryogenic Systems*, 2d Ed., Oxford University Press (1985); Bell, Jr., *Cryogenic Engineering*, Prentice Hall, Inc. (1963); Vance, *Cryogenic Technology*, John Wiley & Sons, Inc. (1963) and Timmerhaus et al., *Cryogenic Process Engineering*, Plenum Press (1989).

In addition, U.S. Pat. Nos. 3,320,755; 3,714,796 and 3,728,868 disclose cryogenic refrigeration systems (i.e. cryostats). U.S. Pat. No. 4,237,699 relates to cryostats for producing cryogenic refrigeration by expansion of a working fluid through a Joule-Thomson orifice. The cryostat disclosed in U.S. Pat. No. 4,237,699 can be placed in a dewar so that the liquefied working fluid can be maintained to cool an object such as an infrared detector. Similarly, U.S. Pat. Nos. 3,021,683 and 3,048,021 relate to gas liquefiers. U.S. Pat. No. 4,653,284 discloses a Joule Thomson heat exchanger and cryostat. U.S. Pat. No. 4,781,033 discloses a heat exchanger for a fast cooldown. The above-mentioned devices and apparatus are useful in liquefaction processes.

Air liquefaction is often utilized to provide liquid or gaseous oxygen for chemical processing and steel production plants. The remaining liquid nitrogen is used in food processing plants and the like. Liquid nitrogen is also converted to a gas for use as a protective blanket for reactive elements in chemical plants. Because of transportation costs and other factors, liquefied nitrogen is typically re-gasified after being liquefied in an air liquefaction plant for use in such facilities. As discussed in greater detail herein, the liquefied nitrogen is transported from an air liquefaction plant, a tanker or the like through a pipe line to an evaporator where it is gasified. The gasified nitrogen is then transported to the chemical, steel or food processing plant for use.

The gaseous nitrogen blankets protect reactive elements used in various processing plants where explosion or contamination hazards are a significant concern. In addition, many reactive elements used in these plants will undergo oxidation if not adequately protected. In addition to reducing explosion and contamination hazards, gaseous nitrogen blankets also reduce the possibilities of undesired oxidation. For example, gaseous nitrogen blankets are sometimes employed in plants where chlorine is produced from salt brine by electrochemical methods. Additionally, food processing plants may use gaseous nitrogen during food processing to preserve expensive foods. Liquid nitrogen is used to flash freeze shrimp or foods that cannot be processed with acceptable quality using normal freezing processes.

As mentioned above, prior art techniques for providing gaseous nitrogen blankets to these processing plants typically include the use of air liquefaction plants. In large industrial applications for example, a gas pipe line connects the air plant to the chemical processing plant. The liquid nitrogen is converted to a gas in an evaporator and transported through the gas pipe line. The gas pipeline length x from the evaporator to the chemical processing plant is typically about 500–5000 meters. Heat input requirements to the evaporator must be equivalent to the latent heat of vaporization for the liquid nitrogen, i.e. about 43.6 W/liter/hour.

During the summertime and during periods of high humidity, the liquid nitrogen plant often cannot deliver sufficient gas to the chemical plant. This can be attributed in part to the high humidity causing ice formation on the evaporator. In addition to heat energy requirements to the evaporator, geographical location can thus be a limiting factor in designing such plants. Even if such plants can be constructed in areas where the climate is subject to frequent periods of high humidity, additional design and construction costs must be taken into account to protect the evaporator from the disadvantages associated with such icing.

Another disadvantage associated with the prior art is that separate cooling systems are utilized for power supplies and other large equipment requiring active cooling. For example, in situations where large power supplies are also used in the plant, they are typically either water or air cooled. Consequently, the regulation of nitrogen gas flow from the evaporator is separate from the process requirements in the plant.

It would therefore be desirable to provide methods and apparatus for improving liquid cryogen gasification such that heat energy requirements and disadvantages caused by high humidity environments are reduced, thereby overcoming the shortcomings associated with the prior art. The resulting gasification will also improve the operation of large equipment requiring active cooling.

SUMMARY OF THE INVENTION

It is an object of the present invention to provide methods and apparatus for utilizing cryoelectronics systems for gas production systems.

It is another object of the invention to provide methods and apparatus for utilizing waste heat from cryoelectronics energy converters to gasify a cryogenic fluid for subsequent use.

It is a further object of the invention to provide methods and apparatus for providing refrigeration units for cryoelectronics systems in combination with gasification units.

It is still a further object of the invention to provide methods and apparatus for gas production proportional to load requirements in a processing plant.

It is still another object of the invention to provide methods and apparatus for improving the cost effectiveness and efficiency of various processing plants such as chemical plants, steel plants and food processing plants.

These and other objects of the invention are provided by methods and apparatus that use the waste heat from cryoelectronics energy converters (i.e. cryoconverters or dissipative active electrical devices) to gasify nitrogen (or other cryogenic fluid) for chemical or other plants requiring substantial amounts of clean nitrogen (or such other cryogenic fluid). This is accomplished by utilizing high temperature superconductor (HTS) bus bar stock to carry electricity, and cryogenically cooled power electronics for energy conversion and power factor correction to improve the cost effectiveness of chemical plants, steel plants and the like. The power electronic components can be positioned in a controlled cryogenically cooled environment such as a liquid nitrogen environment, which provides refrigeration to the components. Waste heat from the refrigeration process is used to produce nitrogen gas for the process plant. In an alternative embodiment of the invention, high current electrical switches can be installed in this liquid nitrogen environment to avoid the cost of cleaning and maintenance.

The liquid nitrogen can be gasified at a rate directly proportional to the load requirements of the plant. Thus, the present invention utilizes the waste heat from cryoelectronics energy converters to gasify nitrogen for such plants and eliminates the need for separate refrigeration systems for power supplies to the plant.

The present invention can also be utilized to gasify other cryogenic liquids using the same process or with slight modifications. For example, the present invention can be used in connection with the gasification of liquefied natural gas, carbon dioxide, oxygen, hydrogen, argon, neon and the like.

The present invention employs a liquid air plant or another source of liquid nitrogen such as a tanker truck, a storage tank or the like. In a cryogenic power electronics apparatus, liquid cryogen will flow through a cryostat or gasifier. The cryostat or gasifier can be utilized to evaporate the liquid cryogen, such as liquid nitrogen. Appropriate piping, pipe lines, fittings, valves and the like can be used to connect the source of liquid nitrogen, the gasifier and the process plant.

For example, a liquid air plant can ship liquid nitrogen by tanker or through a pipe line. The power electronics for the plant is housed in the gasifier and operates as a nitrogen gasifier while the liquid nitrogen provides cooling for the power electronics. The optimization of the cryogenics design of the cryoelectronics is not penalized for the refrigeration system. In a synchronous rectifier design for example, 0.125 V forward drop at 75,000 A provides the energy available for gasification of 9.3 kW. This will gasify over 100,000 liters of gas per hour. The gas production rate can be directly proportional to the load in the electrochemical or other chemical plant.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the Preferred Embodiments.

BRIEF DESCRIPTION OF THE DRAWINGS

For a fuller understanding of the present invention, reference is had to the following description taken in conjunction with the accompanying drawings, in which:

FIG. 1 illustrates a flow diagram of prior art techniques utilized to provide gaseous oxygen or nitrogen to chemical processing plants;

FIG. 2 shows a flow diagram suitable providing cryogenic fluids to chemical processing plants in accordance with the present invention;

Similar reference characters refer to similar parts throughout the several views of the drawings.

DETAILED DESCRIPTION OF THE PREFERRED EMBODIMENTS

Figure 3:
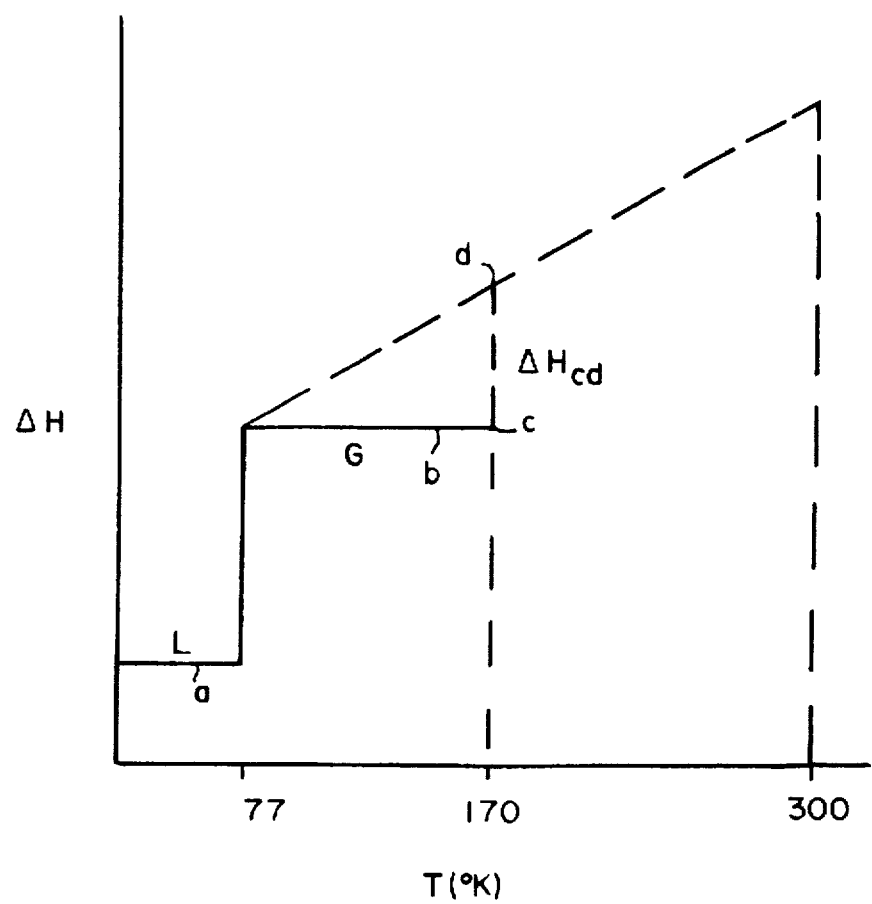
FIG. 3 illustrates a graph of enthalpy versus temperature for nitrogen.

As mentioned above, prior art techniques of providing gaseous nitrogen or oxygen to chemical processing plants have included the use of air liquefaction plants and an evaporator. As illustrated in FIG. 1 for example, prior art systems 10 include air liquefaction plant 30 coupled to evaporator 40 by pipe line 32. Alternatively, liquid nitrogen can be provided to evaporator 40 by tanker 20 through pipe line 22.

Liquid nitrogen is converted to a gaseous state in evaporator 40 and pumped through pipe line 42 to chemical processing plant 50. The length x of pipe line 42 is typically 500–5000 m. As further shown in FIG. 1, energy requirements equivalent to the latent heat of vaporization for nitrogen (i.e. about 43.6 W/liter/hour) must be provided to evaporator 40.

In addition to requiring input of the heat necessary to gasify the liquid nitrogen, another disadvantage associated with prior art techniques such as those shown in FIG. 1 include the problems discussed above in connection with ice formation on the evaporator during periods of high humidities. Consequently, construction of chemical processing plants in geographical areas subject to high humidity environments can be undesirable or impractical due to increased cost of construction and design to compensate for ice formation on the evaporator.

Further, prior art systems typically include separate cooling or refrigeration systems for power supplies to the processing plant. As a result, the regulation of gaseous nitrogen flow to the processing plant is separate and not necessarily proportional to the process requirements in the chemical plant.

The present invention overcomes these disadvantages by combining the use of cryoelectronics energy converters and the waste heat generated by refrigerating such converters to gasify nitrogen or other cryogenic fluids in a manner that can be directly proportional to the load requirements in a chemical processing facility. The use of cryoelectronics energy converters provide for high performance, thereby enhancing the overall performance of the system. Additionally, the use of the waste heat generated by refrigeration of the converters eliminates or reduces the need to provide energy to an evaporator as practiced in accordance with prior art techniques.

A flow diagram for a system 100 suitable for use in accordance with the present invention is shown in FIG. 2. System 100 includes a gasifier unit 110. As discussed herein, gasifier unit 110 includes cryogenically cooled power electronic devices that provide power to a processing unit 126. Processing unit 126 can be a chemical processing plant, a steel plant, a cryogenic freezing plant or the like.

For purposes of illustration, liquid nitrogen is used to illustrate a cryogenic liquid capable of gasification in accordance with the present invention. It will be appreciated by those skilled in the art, however, that the present invention can also be utilized to gasify other cryogenic liquids using the same process or with slight modifications. For example, the present invention can be used in connection with the gasification of liquefied natural gas, carbon dioxide, oxygen, hydrogen, argon, neon and the like. In addition, any other fluid that is capable of operating at temperatures below room temperature when the fluid is used with the cryoelectronics energy converter is suitable for use in the present invention. Liquid nitrogen can be supplied to gasifier 110 using various techniques. For example, liquid nitrogen can be transported to gasifier 110 by a tanker 112, from a storage tank 114, from an air liquefaction plant 116 or combinations thereof. As also shown in FIG. 2, nitrogen is transported to gasifier 110 through a pipe line 118, which is constructed of materials suitable for transporting liquid nitrogen. It will be appreciated by those skilled in the art however, that liquid nitrogen can be introduced directly into gasifier 110 from the liquid nitrogen source, thereby eliminating pipe line 118.

Nitrogen is gasified in unit 110 and transported to a secondary heat recovery and gas separation unit 120 through pipe line 122. Secondary heat recovery and gas separation unit 120 can be utilized to prevent choke by further separating liquid particles entrained in the gaseous nitrogen flow. If the gasification process in unit 110 is sufficient, it may not be necessary or desirable to employ unit 120. Nitrogen gas exiting unit 110 or unit 120 is then transported to processing unit 126 through pipe line 122 or 124, respectively. Because the cryoelectronic energy converters that power plant 126 are cryogenically cooled in gasifier 110, nitrogen gasified in unit 110 can be produced at a rate sufficient to supply the plant. In preferred embodiments, nitrogen can be gasified in unit 110 at a rate directly proportional to the load requirements in plant 126. As described in greater detail herein, the present invention utilizes the waste heat from cryoelectronics energy converters to gasify the nitrogen for such plants.

The lengths of pipe lines 118, 122 and 124 (e, f and g respectively) can be varied depending on design parameters and the like. System 100 can be operated in a batch or continuous mode.

Referring now to FIG. 3, a graph of enthalpy versus temperature for nitrogen is illustrated. Cryogenic cooling of an object in a cryogenic fluid such as nitrogen produces an amount of waste heat. As shown in FIG. 3, nitrogen is liquid during phase a and gaseous at phase b. The enthalpy of the vapor, $\Delta H_{cd}$, between points c and d is generated during cryogenic cooling of an object. This enthalpy typically remains unused and is often wasted. The present invention utilizes the enthalpy generated during cryogenic cooling of cryoelectronics energy converters to gasify a cryogenic fluid such as nitrogen, thereby reducing energy requirements for the overall operation of processing facilities. This represents a significant improvement over prior art systems which require an amount of heat at least equal to the latent heat of vaporization for nitrogen being introduced into an evaporator.

Figure 4:
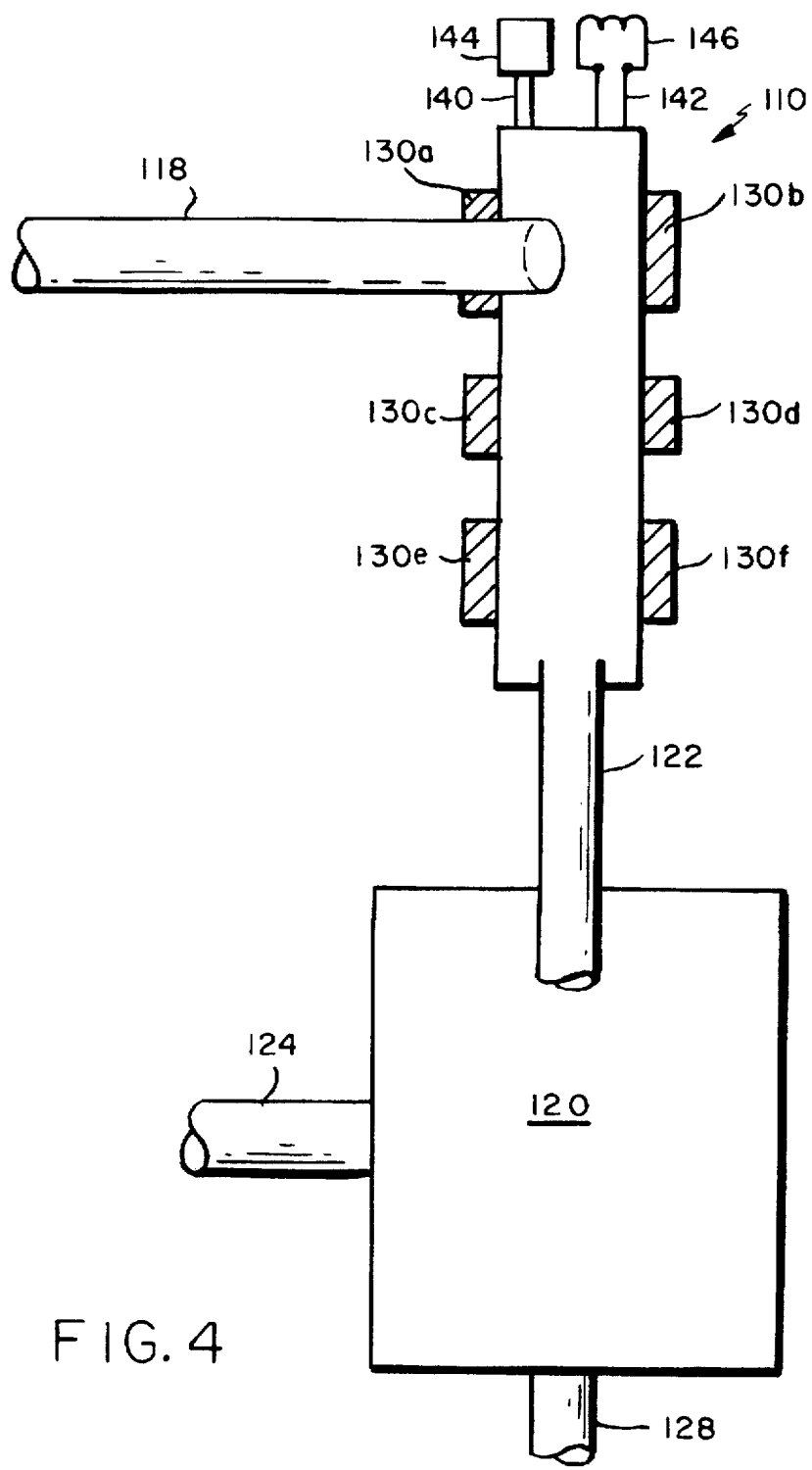
FIG. 4 illustrates dewar and secondary heat recovery and gas separation units according to one embodiment of the present invention.

Referring now to FIG. 4, a gasifier unit 110 and secondary heat recovery and gas separation unit 120 suitable for use in the present invention are shown. Gasifier unit 110 can be a liquid nitrogen manifold and heat sink. Unit 110 functions as a cryostat for the cryoelectronic energy converters. Liquid nitrogen is introduced into unit 110 from pipe line 118 (from a source such as those illustrated in FIG. 2) at a rate that is sufficient to refrigerate the cryoelectronics energy converters and replace gaseous nitrogen removed from unit 110 via pipe line 122. Alternatively, liquid nitrogen can be introduced directly into unit 110 or a liquid air plant can be used to transport liquid nitrogen by tanker instead of transporting gas or liquid through a pipe line. In addition, pipe lines, fittings and valves connecting the gasifier to the process plant are employed.

Gasifier unit 110 includes at least one disipative active electrical device 130. Disipative active electrical device(s), as that term is used herein, refers to cryoelectronic energy converters, i.e. cryoconverters. These devices include power supplies and power sinks in a controlled cryogenically cooled environment such that high performance of the device(s) can be achieved. Preferably, unit 110 includes a plurality of disipative active electrical devices 130a, 130b . . . 130n, as shown in FIG. 4. Cryogenic electronics power supplies and power sinks suitable for use in accordance with the present invention include those disclosed in commonly owned U.S. Pat. No. 5,347,168 and those disclosed in commonly owned copending U.S. application Ser. No. 08/384,780, filed Feb. 6, 1995. The entire contents of both U.S. Pat. No. 5,347,168 and U.S. application Ser. No. 08/384,780 are incorporated herein by reference. The disipative active electrical devices, i.e. cryoconverters, can include MOSFETS and/or diodes. High temperature superconductor (HTS) bus bar stock that carry electricity, and cryogenically cooled power electronics for energy conversion and power factor correction can improve the cost effectiveness of chemical plants, steel plants, food processing plants and the like.

The power electronics thus operate as nitrogen gasifiers while the liquid nitrogen provides cooling for the disipative active electrical devices. The optimization of the cryogenics design of the cryoelectronics is not penalized for the refrigeration system. In a synchronous rectifier design for example, 0.125 V forward drop at 75,000 A provides the energy available for gasification of roughly 9.3 kW. This will gasify over 100,000 liters of gas per hour. In addition, the gas production rate can be directly proportional to the load in the electrochemical or other chemical plant. In preferred embodiments, the gasifier unit 110 will be capable of producing several hundred thousand liters of gas per hour depending on the electrical load of the disipative active electrical devices(s). It will be appreciated by those skilled in the art that more than one gasifier unit can be employed in accordance with the present invention.

As mentioned above, cryogenic power electronics with cryogen flowing through a cryostat can be used for evaporating liquid nitrogen or another cryogenic fluid. As shown in FIG. 4, devices 130a . . . 130n can be on the surface of gasifier unit 110, external to the controlled liquid nitrogen environment. Alternatively, disipative active electrical devices 130a . . . 130n and other components can be positioned within the controlled liquid nitrogen environment (see FIG. 5a), above the liquid nitrogen surface level (see FIG. 5c), or a combination of above and within the liquid nitrogen (see FIG. 5b). The controlled liquid nitrogen environment protects the devices from corrosion and the like. Switches can also be installed in the liquid nitrogen environment to avoid the cost of cleaning and maintenance.

Lines 140 provide connection for power source 144 to disipative active electrical device 130 in gasifier unit 110. Lines 142 provide connections for delivering power to a load 146 in the plant 126. In situations where multiple cryogenic devices operate, interconnections of lines 140 and 142 with the multiple devices 130a . . . 130n can be accomplished within unit 110 at cryogenic temperatures. Oftentimes, high current electrical switches can be placed in the cryogen fluid to change the configuration of the power converters and/or to isolate the power converters from the load.

The liquid nitrogen in unit 110 cools or refrigerates the cryogenic devices. During this process, the heat evolved is utilized to gasify the nitrogen, which is subsequently transported to the processing unit 126. Because the cryogenic devices provide power to the plant 126, the amount of nitrogen gasified is directly proportional to the load demands of the plant. This is advantageous over the prior art in that prior art systems include separate cooling systems for power supplies and the regulation of gas flow is separate from the process requirements.

As further shown in FIG. 4, gaseous nitrogen exiting gasifier unit 110 through pipe line 122 may be introduced into a secondary heat recovery and gas separation unit 120. This may be desirable or necessary to prevent choking in the event that entrained liquid particles are contained in the gaseous nitrogen. Unit 120 separates the entrained particles such that liquid is removed from the gaseous nitrogen and removed from unit 120 through pipe line 128. In some circumstances, it may be desirable to recycle liquid nitrogen exiting unit 120 via pipe line 128 through gasifier unit 110. Gaseous nitrogen is then transported through pipe line 124 to processing plant 126. It should be appreciated that subsequent heat recovery and gas separation in unit 120 may not always be necessary or desirable. In situations where the nitrogen exiting unit 110 is sufficiently gasified, the nitrogen can be transported directly through pipe line 122 to processing unit 126. Thus, the system can be configured such that pipe line 122 is directly connected to processing unit 126. Alternatively, the system can be configured such that a bypass pipe line 122a or the like (see FIG. 2) allows selective utilization of unit 120. Flow control equipment, e.g. a flow control valve 122b or the like, can be included in this embodiment of the invention.

As described above, nitrogen has been used to illustrate a cryogenic liquid capable of gasification in accordance with the present invention. It will be appreciated by those skilled in the art, however, that the present invention can also be utilized to gasify other cryogenic liquids using the same process or with slight modifications. For example, the present invention can be used in connection with the gasification of liquefied natural gas, carbon dioxide, oxygen, hydrogen, argon, neon and the like. In addition, any other fluid that is capable of operating at temperatures below room temperature when the fluid is used with the cryoelectronics energy converter is suitable for use in the present invention.

Figure 5A:
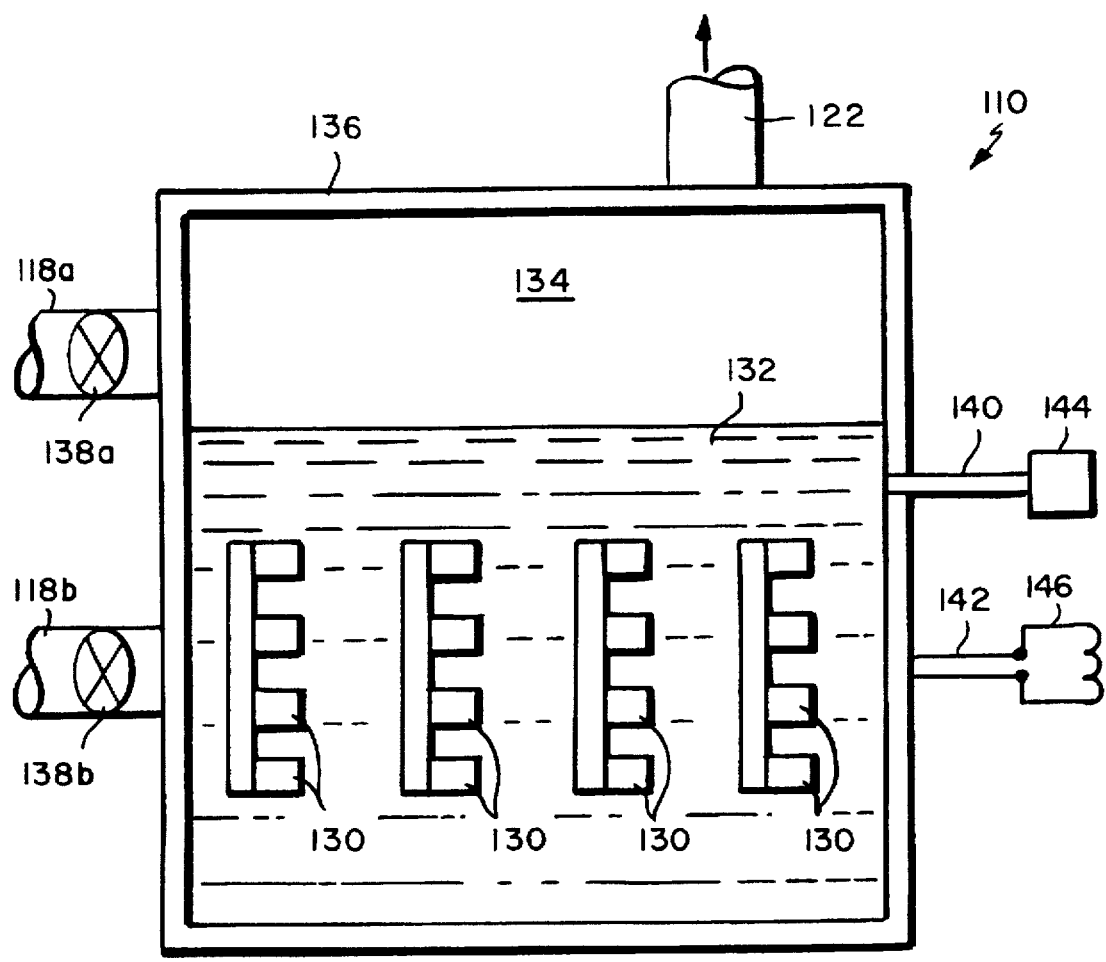
FIGS. 5a–5c illustrate alternative configurations of dewars for use according to the present invention.
Figure 5B:
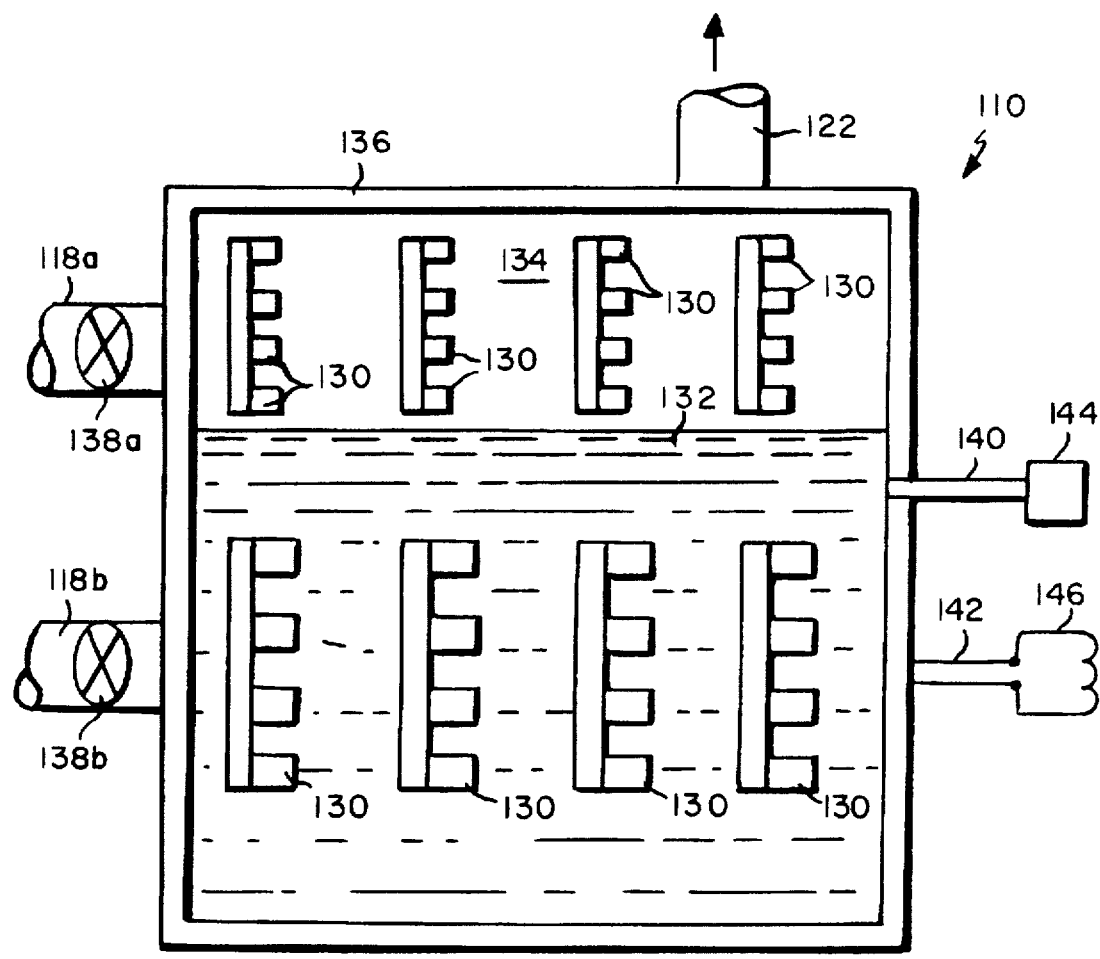
Figure 5C:
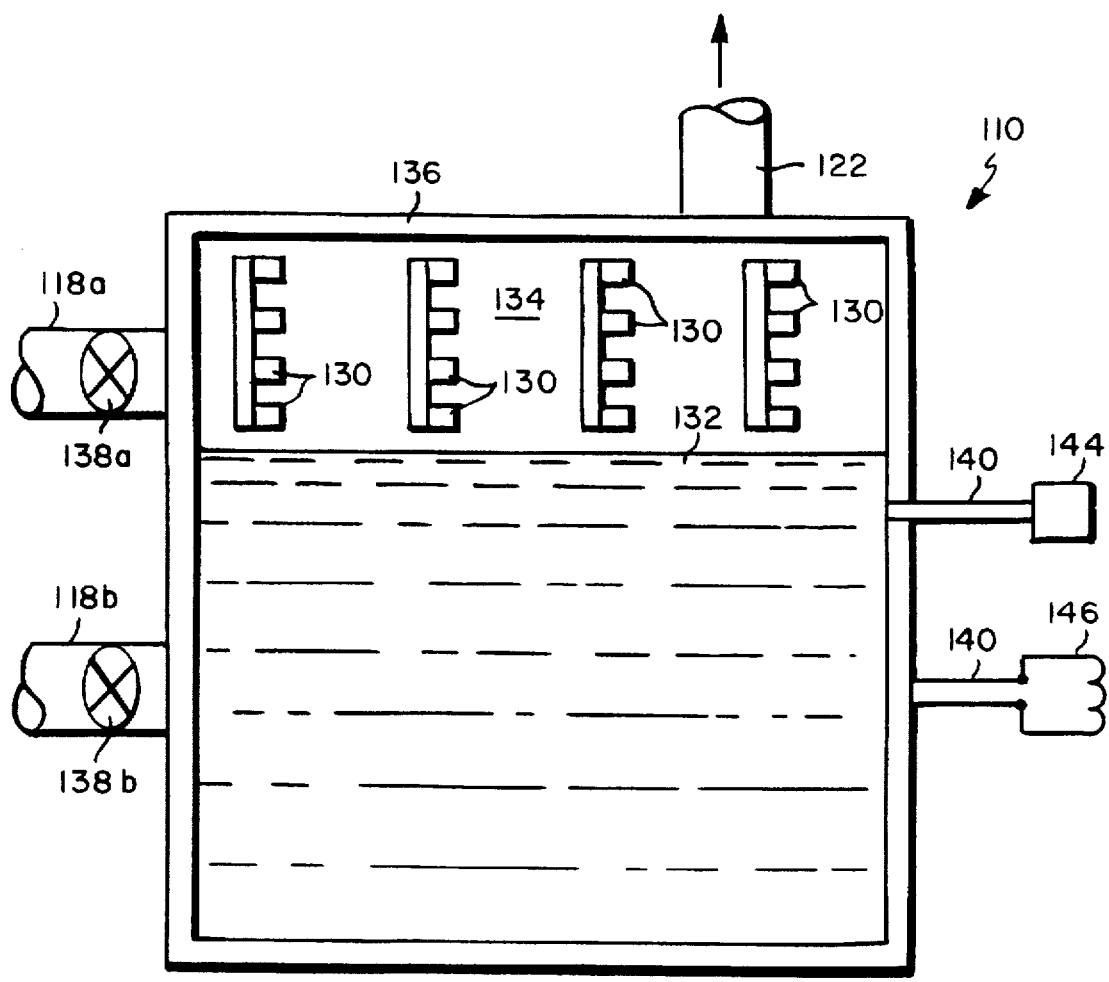

FIGS. 5a–5c show alternative embodiments of the gasifier unit 110. In particular, the embodiments shown in FIGS. 5a–5c include a dewar vessel 136 or other similar vessel. Dewar vessels, which are double walled tanks having evacuated space between the walls of the vessel, are sealed from the atmosphere. Liquid nitrogen can be introduced into vessel 136 through pipeline 118a, above the level of liquid nitrogen 132 in vessel 136. Alternatively, liquid nitrogen can be introduced through pipeline 118b, such that nitrogen enters vessel 136 below the level of liquid nitrogen 132 in vessel 136. In addition, liquid nitrogen can be introduced into vessel 136 through both pipelines 118a and 118b simultaneously. Valves 138a and 138b or other flow control devices can be employed to regulate the flow of nitrogen through pipelines 118a and 118b, respectively. Other alternative arrangements for introducing the nitrogen into vessel 136 can be employed. For example and while not to be construed as limiting, several pipe lines could be disposed around the circumference of vessel 136 and used selectively to introduce liquid nitrogen at predetermined positions and at predetermined times into vessel 136.

As discussed above in connection with FIG. 4, vessel 136 also includes a plurality of disipative active electrical devices 130. As shown in FIG. 5a, these devices can be positioned such that all or substantially all of the disipative active electrical devices are below the liquid nitrogen level 132. Alternatively, if the liquid nitrogen is being used to cool another device (e.g. high temperature superconducting coil) and nitrogen gas and/or mist evolves above the liquid nitrogen, the cryogenic devices can be configured to operate both within the liquid nitrogen and above the liquid nitrogen surface level 132 in the cold gas stream (which may contain liquid particles entrained therein) as shown in FIG. 5b. The cryogenic devices further can be configured to operate above the liquid level of cryogen fluid 132 in the cold gas stream (which may contain liquid particles entrained therein) as also shown in FIG. 5c.

Expansion area 134 is provided to allow nitrogen gas to rise above liquid level 132. Nitrogen gas then exits vessel 136 through pipeline 122 and is transported to secondary heat recovery and gas separation unit 120 or processing plant 126.

As discussed above in connection with FIG. 4, the gasifier unit 110 shown in FIGS. 5a–5c is also preferably capable of producing several hundred thousand liters of gas per hour depending on the electrical load of the disipative active electrical device(s). It will be appreciated by those skilled in the art that more than one gasifier unit can be employed in accordance with the present invention. In addition, the embodiments shown in FIGS. 5a–5c can also be utilized to gasify other cryogenic liquids using the same process or with slight modifications. For example, the present invention can be used to gasify liquefied natural gas, carbon dioxide, oxygen, hydrogen, argon, neon or any other fluid capable of operating at temperatures below room temperature when the cryogenic fluid is used with the cryoelectronic energy converter.

It should be appreciated by those skilled in the art that the specific embodiments disclosed above may readily be utilized as a basis for modifying or designing other methods or structures for carrying out the same purpose of the present invention. It should also be realized by those skilled in the art that such equivalent constructions do not depart from the spirit and scope of the invention as set forth in the appended claims.

What is claimed is:

1. A gasification unit for gasification of a cryogenic fluid, the unit comprising:

a cryostat configured to refrigerate cryoelectronics energy converters to predetermined temperatures;

at least one cryoelectronic energy converter positioned in the cryostat such that, when at least one cryogenic fluid is disposed within the cryostat, the at least one cryogenic fluid refrigerates the at least one cryoelectronic energy converter and heat generated by such refrigeration gasifies at least a portion of the at least one cryogenic fluid at a predetermined rate; and input/output means for supplying power to the at least one cryoelectronics energy converter and receiving power from the at least one cryoelectronics energy converter.

2. The gasification unit of claim 1, further including the at least one cryogenic fluid.

3. The gasification unit of claim 2, wherein the at least one cryogenic fluid comprises nitrogen, liquefied natural gas, carbon dioxide, oxygen, hydrogen, argon, neon or any other fluid that operates at temperatures below room temperature when the at least one cryogenic fluid is used with the cryoelectronic energy converter.

4. The gasification unit of claim 2, wherein the position of the at least one cryoelectronics energy converter in the cryostat is such that the at least one cryoelectronic energy converter is above a surface level of the at least one cryogenic fluid in the cryostat.

5. The gasification unit of claim 4, wherein the position of the at least one cryoelectronics energy converter is at a level where gasified cryogenic fluid is present.

6. The gasification unit of claim 5, wherein the gasified cryogenic fluid contains liquid particulates entrained therein.

7. The gasification unit of claim 2, wherein the at least one cryogenic fluid comprises nitrogen.

8. The gasification unit of claim 1, wherein the at least one cryoelectronic energy converter includes a MOSFET.

9. The gasification unit of claim 8, further including the at least one cryogenic fluid.

10. The gasification unit of claim 9, wherein the at least one cryogenic fluid comprises nitrogen, liquefied natural gas, carbon dioxide, oxygen, hydrogen, argon, neon or any other fluid that operates at temperatures below room temperature when the cryogenic fluid is used with the cryoelectronic energy converter.

11. The gasification unit of claim 1, wherein a plurality of cryoelectronic energy converters are arranged in predetermined positions in the cryostat.

12. The gasification unit of claim 11, further including the at least one cryogenic fluid.

13. The gasification unit of claim 12, wherein the cryogenic fluid comprises nitrogen, liquefied natural gas, carbon dioxide, oxygen, hydrogen, argon, neon or any other fluid that operates at temperatures below room temperature when the at least one cryogenic fluid is used with the cryoelectronic energy converter.

14. The gasification unit of claim 1, wherein the unit is configured to gasify at least 1 liter/hour of cryogenic fluid.

15. The gasification unit of claim 14, further including the at least one cryogenic fluid.

16. The gasification unit of claim 15, wherein the at least one cryogenic fluid comprises nitrogen, liquefied natural gas, carbon dioxide, oxygen, hydrogen, argon, neon or any other fluid that operates at temperatures below room temperature when the at least one cryogenic fluid is used with the cryoelectronic energy converter.

17. The gasification unit of claim 1, further including a secondary heat recovery unit coupled to the gasification unit.

18. The gasification unit of claim 17, wherein the secondary heat recovery unit is configured to separate entrained liquid particles from the gasified cryogenic fluid produced by the gasification unit.

19. The gasification unit of claim 1, further including the at least one cryogenic fluid in the unit and wherein the at least one cryoelectronic energy converter is positioned below the surface level of the at least one cryogenic fluid.

20. A system for providing a gasified cryogenic fluid to a processing plant, the system comprising:
 a gasification unit for gasification of a cryogenic fluid, the unit comprising:
  a cryostat configured to refrigerate cryoelectronics energy converters to predetermined temperatures;
  at least one cryoelectronic energy converter positioned in the cryostat such that, when at least one cryogenic fluid is disposed within the cryostat, the at least one cryogenic fluid refrigerates the at least one cryoelectronic energy converter and heat generated by such refrigeration gasifies at least a portion of the at least one cryogenic fluid at a predetermined rate; and
  input/output means for supplying power to the at least one cryoelectronics energy converter and receiving power from the at least one cryoelectronic energy converter; and
 a chemical processing plant coupled to the gasification unit.

21. The system of claim 20, wherein the chemical processing unit is coupled to the gasification unit by a pipe line.

22. The system of claim 21, wherein the pipe line is configured to transport gasified cryogenic fluid therethrough.

23. The system of claim 22, further including a predetermined amount of the at least one cryogenic fluid in the gasification unit.

24. The system of claim 23, wherein the at least one cryogenic fluid comprises nitrogen, liquefied natural gas, carbon dioxide, oxygen, hydrogen, argon, neon or any other fluid that operates at temperatures below room temperature when the at least one cryogenic fluid is used with the cryoelectronic energy converter.

25. The system of claim 23, wherein the at least one cryogenic fluid comprises nitrogen.

26. The system of claim 20, wherein the position of the at least one cryoelectronics energy converter in the cryostat is such that the at least one cryoelectronic energy converter is above a surface level of the at least one cryogenic fluid in the cryostat.

27. The gasification unit of claim 26, wherein the position of the at least one cryoelectronic energy converter is at a level where gasified cryogenic fluid is present.

28. The gasification unit of claim 27, wherein the gasified cryogenic fluid contains liquid particulates entrained therein.

29. The system of claim 20, wherein the at least one cryoelectronic energy converter is configured to provide power to the chemical processing plant.

30. The system of claim 29, wherein the gasification unit is configured to provide gasified cryogenic fluid to the chemical processing plant.

31. The system of claim 30, wherein the gasification unit is further configured to provide gasified cryogenic fluid at a rate proportional to the power provided to the chemical processing plant.

32. The system of claim 31, further including a predetermined amount of the at least one cryogenic fluid in the gasification unit.

33. The system of claim 32, wherein the at least one cryogenic fluid comprises nitrogen, liquefied natural gas, carbon dioxide, oxygen, hydrogen, argon, neon or any other fluid that operates at temperatures below room temperature when the at least one cryogenic fluid is used with the cryoelectronic energy converter.

34. The system unit of claim 20, wherein the at least one cryoelectronics energy converter includes a MOSFET.

35. The system of claim 20, wherein a plurality of cryoelectronic energy converters are arranged in predetermined positions in the cryostat.

36. The system of claim 35, further including the at least one cryogenic fluid.

37. The system of claim 36, wherein the at least one cryogenic fluid comprises nitrogen, liquefied natural gas, carbon dioxide, oxygen, hydrogen, argon, neon or any other fluid that operates at temperatures below room temperature when the at least one cryogenic fluid is used with the cryoelectronic energy converter.

38. The system of claim 20, wherein the gasification unit is configured to gasify at least 1 liter/hour of cryogenic fluid.

39. The system of claim 20, further including a secondary heat recovery unit coupled to the gasification unit, the secondary heat recovery unit positioned upstream of the chemical processing unit.

40. The system of claim 39, wherein the secondary heat recovery unit is configured to separate entrained liquid particles from gasified cryogenic fluid produced by the gasification unit.

41. The system of claim 20, further including the at least one cryogenic fluid in the gasification unit and wherein the at least one cryoelectronic energy converter is positioned below the surface level of the at least one cryogenic fluid.

42. The system of claim 20, further including a source of the at least one cryogenic fluid.

43. The system of claim 42, wherein the source of the at least one cryogenic fluid comprises an air liquefaction plant.

44. The system of claim 42, wherein the source of the at least one cryogenic fluid comprises a storage tank.

45. The system of claim 42, wherein the source of the at least one cryogenic fluid comprises a vehicle.

46. The system of claim 42, 43, 44, or 45, wherein the at least one cryogenic fluid comprises nitrogen, liquefied natural gas, carbon dioxide, oxygen, hydrogen, argon, neon or any other fluid that operates at temperatures below room temperature when the at least one cryogenic fluid is used with the cryoelectronic energy converter.

47. A method for gasifying a cryogenic fluid, comprising:

introducing a predetermined amount of at least one cryogenic fluid into a gasification unit, the gasification unit having at least one cryoelectronic energy converter at a predetermined position therein; and allowing the at least one cryogenic fluid to refrigerate the at least one cryoelectronic energy converter under conditions sufficient for heat generated during the refrigeration to gasify at least a portion of the at least one cryogenic fluid.

48. The method of claim 47, wherein the at least one cryogenic fluid comprises nitrogen.

49. The method of claim 47, further including introducing at least a portion of the gasified cryogenic fluid to a chemical processing plant.

50. The method of claim 49, wherein the chemical processing plant is a chlorine manufacturing plant.

51. The method of claim 49, wherein the chemical processing plant is a food processing plant.

52. The method of claim 49, wherein the chemical processing plant is a steel manufacturing plant.

53. The method of claim 47, 49, 50, 51, or 52, wherein the at least one cryogenic fluid comprises nitrogen, liquefied natural gas, carbon dioxide, oxygen, hydrogen, argon, neon or any other fluid configured to operate at temperatures below room temperature when the at least one cryogenic fluid is used with the cryoelectronic energy converter.

54. The method of claim 47, 49, 50, 51, or 52, wherein the gasification unit is configured to gasify at least 1 liter/hour of cryogenic fluid.

55. The method of claim 47, further including introducing at least a portion of the gasified cryogenic fluid to a secondary heat recovery unit coupled to the gasification unit.

56. The method of claim 55, further including separating entrained liquid particles from the gasified cryogenic fluid produced by the gasification in the secondary heat recovery unit.

57. A gasification unit for gasification of a cryogenic fluid, the unit comprising:

a cryostat configured to refrigerate cryoelectronics energy converters to predetermined temperatures;

a predetermined amount of liquid nitrogen disposed within the cryostat;

at least one cryoelectronic energy converter positioned in the cryostat such that at least a portion of the liquid nitrogen refrigerates the at least one cryoelectronic energy converter and heat generated by such refrigeration gasifies at least a portion of the liquid nitrogen at a predetermined rate; and input/output means for supplying power to the at least one cryoelectronics energy converter and receiving power from the at least one cryoelectronics energy converter.

58. A system for providing a gasified cryogenic fluid to a processing plant, the system comprising:

a gasification unit for gasification of a cryogenic fluid, the unit comprising:

a cryostat configured to refrigerate cryoelectronics energy converters to predetermined temperatures;

a predetermined amount of liquid nitrogen disposed within the cryostat;

at least one cryoelectronic energy converter positioned in the cryostat such that at least a portion of the liquid nitrogen refrigerates the at least one cryoelectronic energy converter and heat generated by such refrigeration gasifies at least a portion of the liquid nitrogen at a predetermined rate; and input/output means for supplying power to the at least one cryoelectronics energy converter and receiving power from the at least one cryoelectronic energy converter; and a chemical processing plant coupled to the gasification unit.

59. A method for gasifying a cryogenic fluid, comprising:

introducing a predetermined amount of liquid nitrogen into a gasification unit, the gasification unit having at least one cryoelectronic energy converter at a predetermined position therein; and allowing the liquid nitrogen to refrigerate the at least one cryoelectronic energy converter under conditions sufficient for heat generated during the refrigeration to gasify at least a portion of the liquid nitrogen.

* * * * *